US009369284B2

(12) United States Patent
McCoy et al.

(10) Patent No.: US 9,369,284 B2
(45) Date of Patent: Jun. 14, 2016

(54) BROWSER BASED IDENTITY WITH MULTIPLE LOGIN

(71) Applicant: GOOGLE INC., Mountain View, CA (US)

(72) Inventors: Travis Elton McCoy, Fraser, CO (US); Alex Ainslie, San Francisco, CA (US); Sebastien Vincent Gabriel, San Francisco, CA (US)

(73) Assignee: Google Inc., Mountain View, CA (US)

( * ) Notice: Subject to any disclaimer, the term of this patent is extended or adjusted under 35 U.S.C. 154(b) by 62 days.

(21) Appl. No.: 14/244,407

(22) Filed: Apr. 3, 2014

(65) Prior Publication Data

US 2015/0288522 A1    Oct. 8, 2015

(51) Int. Cl.
| | |
|---|---|
| *G06F 15/16* | (2006.01) |
| *H04L 29/06* | (2006.01) |
| *H04L 9/32* | (2006.01) |
| *G06F 21/31* | (2013.01) |
| *G06F 15/173* | (2006.01) |
| *H04L 29/08* | (2006.01) |

(52) U.S. Cl.
CPC .............. *H04L 9/3234* (2013.01); *G06F 21/31* (2013.01); *H04L 63/08* (2013.01); *H04L 67/02* (2013.01)

(58) Field of Classification Search
CPC ....... G06F 21/34; G06F 7/1008; G06F 21/31; G06Q 20/341; H04L 63/0853
USPC .......................... 726/9; 713/150–181; 709/225
See application file for complete search history.

(56) References Cited

U.S. PATENT DOCUMENTS

| | | | |
|---|---|---|---|
| 6,725,269 B1 | 4/2004 | Megiddo | |
| 2007/0214272 A1* | 9/2007 | Isaacson | G06F 17/30861 709/229 |
| 2008/0046983 A1 | 2/2008 | Lester et al. | |
| 2008/0209338 A1* | 8/2008 | Li | G06F 17/30867 715/745 |
| 2013/0086657 A1* | 4/2013 | Srinivasan | H04L 63/10 726/6 |
| 2014/0257999 A1* | 9/2014 | Garcia-Martinez | G06Q 30/0275 705/14.71 |

FOREIGN PATENT DOCUMENTS

WO    2015153990 A1    10/2015

OTHER PUBLICATIONS

"How Do I Manage My Persona Account", Mozilla Support, retrieved on Oct. 23, 2013 from https://support.mozilla.org/en-US/kb/how-do-i-manage-my-persona-account, 5 pages.
"Use the Profile Manager to Create and Remove Firefox Profiles", Mozilla Support, retrieved on Oct. 23, 2013 from https://support.mozilla.org/en-US/kb/profile-manager-create-and-remove-firefox-profiles, 4 pages.

(Continued)

*Primary Examiner* — Evans Desrosiers
(74) *Attorney, Agent, or Firm* — Brake Hughes Bellermann LLP

(57) ABSTRACT

A system provides a graphical user interface element in a browser. The browser provides multiple different identities for the browser, each of the multiple different identities associated with a different user, each of the multiple different identities being associated with a plurality of accounts. Upon receiving a selection of the graphical user interface element from a first user, the system matches the first user with a first identity that is stored by the browser and associated with the first user. Upon receiving a second selection of the graphical user interface element from a second user, the system matches the second user with a second identity that is stored by the browser and associated with the second user.

23 Claims, 15 Drawing Sheets

(56) References Cited

OTHER PUBLICATIONS

"What is Persona and How Does It Work?", Mozzila Support, retrieved on Oct. 23, 2013 from https://support.mozilla.org/en-US/kb/what-is-persona-and-how-does-it-work, 3 pages.

Hanson, et al, "Federated Browser-Based Identity using Email Addresses", Apr. 27, 2011, 5 pages.

International Search Report and Written Opinion for PCT Patent Application No. PCT/US2015/024277, mailed on Jul. 30, 2015, 13 pages.

Paul, Ian, "How to Create and Manage Multiple User Profiles in Chrome", available online at <http://www.pcworld.com/article/2089364/how-to-create-and-manage-multiple-user-profiles-in-chrome.html>, retrieved on Jul. 16, 2015, 4 pages.

Purdy, Kevin, "Chrome browser adds multiple user sign-in and syncing", available online at <http://www.techrepublic.com/blog/google-in-the-enterprise/chrome-browser-adds-multiple-user-sign-in-and-syncing.html>, retrieved Jul. 16, 2015, 4 pages.

\* cited by examiner

BROWSER BASED IDENTITY WITH MULTIPLE LOGIN

TECHNICAL FIELD

This disclosure generally relates to web browser technology, and in particular, to an identity mechanism for a web browser.

BACKGROUND

A web browser may maintain an identity and authenticate the identity to a server. Yet, there is no system to provide a common identity across different web applications or a different identity for multiple users of a web application that can be easily accessed via the web browser. Each time a user accesses a different web application, web service, or website, the user may have to login separately. Moreover, a user may have multiple accounts for various third party websites, where the websites are each managed separately. For example a bank website, a social media service website, and photo editing website may all be managed by separate companies or entities, each of the companies or entities being unrelated to the browser (i.e., the websites may be considered as "third parties"). Each third party website may not wish to trust a browser alone to authenticate a user. Instead each third party website may have its own authentication methods for a user. Yet, it can prove very difficult for multiple users to maintain different usernames and passwords, and to have to login so many times to various different websites or web applications. Moreover, multiple users may wish to use the same computer but each user may have different credentials for each website or web application. Accordingly, a need exists for systems and methods to address the shortfalls of present technology and to provide other new and innovative features.

SUMMARY

A method includes providing a graphical user interface element in a browser, wherein the browser provides multiple different identities for the browser, each of the multiple different identities associated with a different user, each of the multiple different identities being associated with a plurality of accounts; upon receiving a selection of the graphical user interface element from a first user, matching the first user with a first identity that is stored by the browser and associated with the first user; and upon receiving a second selection of the graphical user interface element from a second user, matching the second user with a second identity that is stored by the browser and associated with the second user.

Other implementations of this aspect include corresponding systems, apparatus, and computer programs, configured to perform the actions of the methods, encoded on computer storage devices.

In various implementations, the method includes automatically syncing data associated with the first identity among multiple computing devices associated with the first identity. In some implementations, the method includes using the first identity to obtain a token from a web application associated with the browser; and authenticating the first user to the web application using the token. In some implementations, the web application is precompiled and executed directly by a processor of the computing device using a browser-based runtime environment. In some implementations, the web application is coded using browser-based language. At least some of the accounts may be associated with third party website services.

According to another general aspect, a method includes providing a graphical user interface element in a chrome frame of a browser, wherein the browser provides multiple different identities for the browser, each of the multiple identities associated with a different user; upon receiving a selection of the graphical user interface element from a first user, matching the first user with a single identity that is stored by the browser and associated with the first user; using the single identity to obtain a token from a web application associated with the browser; and authenticating the first user to the web application using the token. Other implementations of this aspect include corresponding systems, apparatus, and computer programs, configured to perform the actions of the methods, encoded on computer storage devices.

In some implementations, the method includes automatically syncing the single identity among multiple computing devices associated with the identity of the first user. In some implementations, the method includes storing the token in association with the single identity. In some implementations, the graphical user interface element provides an option for the first user to associate an account with the single identity. In some implementations, the single identity is associated with multiple accounts for the first user, at least some of the multiple accounts being associated with third party web services. In some implementations, the graphical user interface element provides an option for a second user to access a second identity associated with the browser. In some implementations, the second identity includes multiple accounts for the second user.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
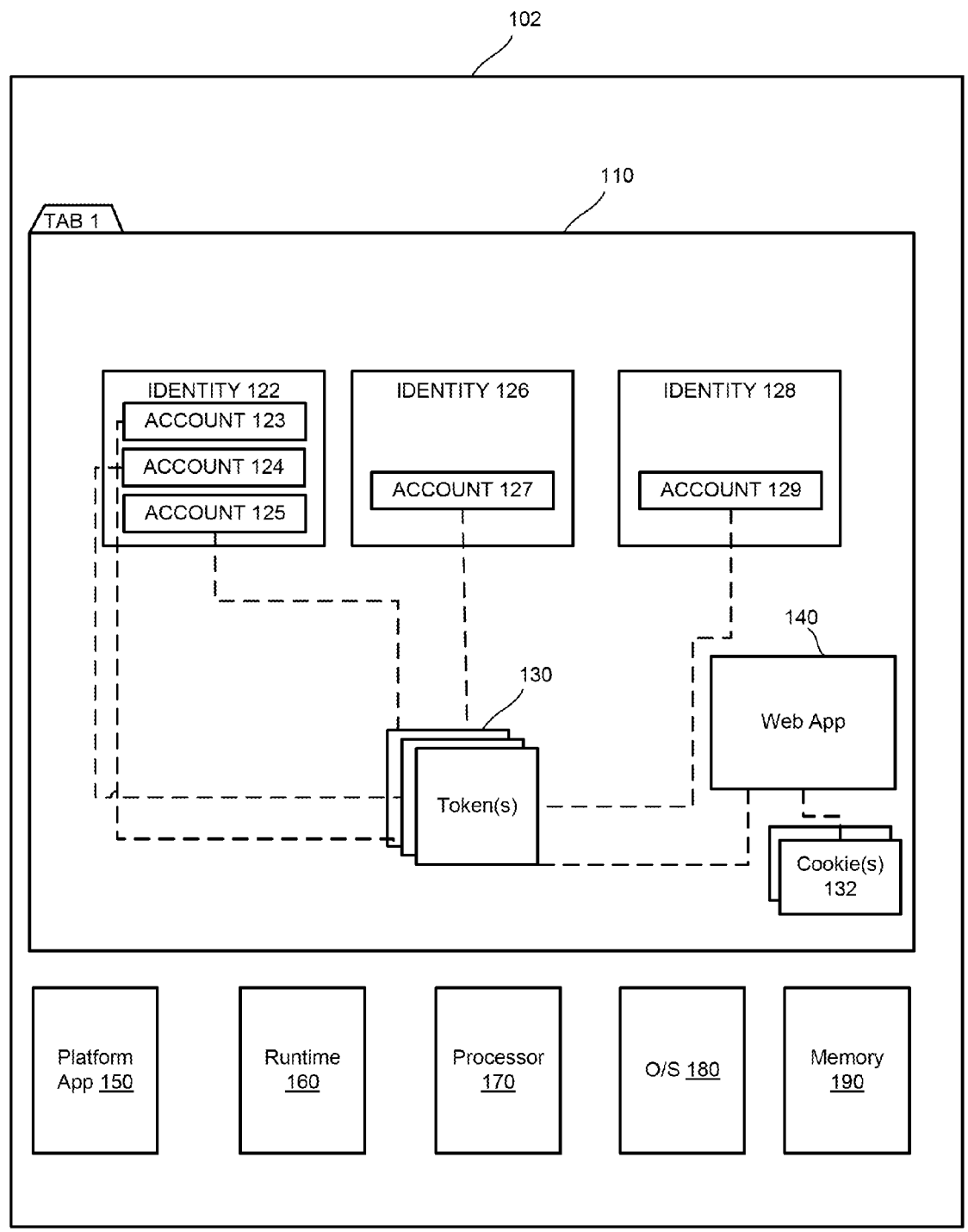
FIG. 1 is a schematic block diagram of an example computer system that executes a browser that communicates with a web application.

FIG. 1 illustrates an example computer system 102. The computer system 102 may include a web browser application 110 that may display a user interface including various tabs. Various implementations of the techniques and systems described herein may be used to maintain and provide a secure browser identity for a user. The techniques and systems may be implemented, for example, with web applications (e.g., web application 140) that maintain high scores on a game and that want to know who a user is when entering a high score. As another example, the described systems and methods may be used by shopping-related web applications to avoid requiring a user of a browser application to login every time the user goes to purchase an item using the web application. As another example, an operator of a blog site can use the described systems and methods to uniquely identify people who post to the blog site. The blog site owner would not need to store username and passwords to identify people who post, which may be undesirable, because if the blog site gets hacked, those usernames and passwords may be used to break into other accounts maintained by the user, reflecting poorly on the blog site owner. As yet another example, a user's identity also can be used by a website or web application 140 that provides for email routing.

A web browser, such as browser application 110, is executed by a client device and can receive code (e.g., HTML code) from a remote server (e.g., a remote server that hosts a website) and can execute the received code on the client device for the benefit of a user of the client device. In various implementations, the browser application may be associated with one or more web applications (e.g., web applications 140). Web applications can be "hosted applications" or "packaged applications." As used herein hosted applications may include at least a portion of a website that itself includes web pages. Some web applications may also include metadata that may be especially pertinent to the web application or to the user of the web application to allow the web application to perform some particular functionality for the user. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using Extension APIs, allowing packaged applications to change the way the browser behaves or looks. In various implementations, a web browser may include or be configured to interact with one or more browser extensions. In this context, a "browser extension" may include one or more web pages packaged or grouped together as a definable whole, and configured to extend the functionality to the web browser. Browser extensions may be webpages and may use all application programming interfaces (APIs) that the browser application provides to web pages. A browser extension may include HTML, CSS, JAVASCRIPT, images, other types of files, and web-related computer languages and code. Thus, browser extensions also provide extra functionality to a browser, but generally, unlike web applications, there is little or no user interface component to the functionality provided by a browser extension. Instead, browser extensions extend the functionality of the browser and the websites being viewed in it. For example, browser extensions can extend the functionality of the browser by adding a new button to the address bar, such as an ever-present currency converter. Buttons like this can also apply to the current website being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, an extension may be installed to embed a "mail this" button next to every link in every page. Compared to web applications, extensions cut across websites and web applications. Extensions may be in effect across all websites (though some are site-specific). Web applications may not combine with other applications in this way. Rather, web applications generally run standalone, like any regular website. Web applications may be coded using browser-based language. For example, web applications may be coded using HTML, CSS, or JAVASCRIPT, as examples.

A platform application such as the platform application 150 shown in FIG. 1 may be downloaded from a marketplace server via a web browser, such as a browser application 110, and may be installed on computer system 102. The platform application 150 may operate using a runtime 160. The platform application 150 may be configured to be executed directly by a processor 170 (e.g., microprocessor) of the computer system 102, using the runtime 160, for example. Because the platform application 150 is coded with web technologies, no compilation step is required. Instead, the platform application 150 may simply be packaged (e.g., in a .CRX format, or zipped, for example with some signature or verification) and provided the computer system 102, for example the browser application from a digital marketplace or other remote server. The runtime 160 may accept the platform application 150 as a packaged file (e.g., .CRX files) and then execute platform application 150. The platform application 150 may load locally, so that it is less dependent on a network than a web application, such as the web application 140. The runtime 160 may be an environment that operates above a native O/S 180 and that uses a multi-process architecture. Thus, if one platform application 150 crashes, a user will not lose other platform applications that are simultaneously also running via runtime 160. Each application operates as a new process on the runtime 160. The runtime 160 may act as an intermediary environment that allows a platform application 150 to run on any computing device using any operating system, as long as the runtime 160 is installed on the computing device, such as the computer system 102. The runtime 160 may allow the platform application 150 to appear as if it is a native application, while the platform application 150 is not actually being executed through the O/S 180 (but still may be able to access portions of the O/S 180). The runtime 160 may also, in some implementations, be utilized to execute the browser application.

Examples of web applications include email applications, calendars, photo editing applications, games, or banking applications. One or more web applications may require some form of authentication to use the web application for personal use. For example, a user that accesses a banking web application may need to login or otherwise authenticate himself to access his personal bank account information.

Users may wish to avoid having to re-login or re-authenticate themselves to websites web applications with every instance of opening the application or accessing the website. Each single user may have a corresponding single identity such as identity 122, 126, or 128. Each identity may be unique to a single person and may correspond with a table or other data structure that is automatically generated or stored by a system, such as a server. The identity may be unique to a single person, and may represent a string or other unique identifier, such as "ABCSMITH18," as an example. Each real person has one identity, although each person may have multiple accounts or "profiles" (such as accounts for different personal use, businesses, or side businesses). Each different account can be associated with different websites or information available on the website. For example, if John accesses a document editing web service when logged in as john@work.com, he may receive different information such as different work documents including memos, than when John accesses the same document editing web service when John is logged in as john@mail.com, where he might see all of his personal documents such as grocery lists.

In various implementations, each single identity may be associated with multiple "accounts" or "personas." An account may be a personal record including at least one identifier and data that is associated with a particular web application or website. Examples of accounts include bank accounts, email accounts, or photo editing accounts. As an example, an e-mail web application account may include at least one identifier such as a username and/or password, and data that is associated with the e-mail web application, such as messages. As another example, a banking web application account may include at least one identifier such as a username and/or password, and data that is associated with the banking web application, such as a checking account balance, a savings account balance, transactions, messages between a customer and a bank, and deposits. As yet another example, a photo editing web application account may include at least one identifier such as a username and/or password, and data that is associated with the photo editing web application, such as photos and metadata for each of the photos.

In some implementations, each identity may include multiple accounts per website (such as a personal, business, and family account for an e-mail service or a shopping website). For example, the identity 122 is associated with accounts 123, 124, and 125. The identity 126 is associated with account 127. The identity 128 is associated with account 129. Each account may include an e-mail account corresponding to a separate e-mail address for a certain e-mail provider or website, for example, or each account may correspond to a separate third party account. For example, a user Anne may have the identity 122 which may be, as an example, a string "Anne-Smith." Anne's accounts may include a first account 123 for Anne's email account corresponding to an e-mail web application hosted by the domain example.com, and having the example email address anne@example.com Anne's accounts may also include a second account 124 for Anne's extra email account corresponding to the same example email web application example.com and having the email address happy@example.com Anne's accounts may also include a third account 125 corresponding to a social media web application social.com and having a login email address of anne@social.com.

In various implementations, a web application 140 such as the email web application hosted by example.com may generate at least one token 130, for example upon request by a browser application 110, as described in more detail below. The system may use token 130, which may be an alphanumeric string that is created by the web application. The browser application 110 may store the token 130. When the user visits the web application (or website) a second or future time, the website sends a request to the browser application 110 for the token 130. Upon receipt of the token 130, the website determines that the token 130 is valid. If the token 130 is valid, the website generates a cookie 132. In some implementations, the website may generate or provide a token 130 only if the website requests the browser application 110 to prompt the user (e.g., via a graphical user interface element such as a pop-up window or other request) to determine if the user wants to save the account, and if the user agrees to save the account in response to the prompt. Such an implementation may avoid a website setting a permanent credential that could be used to identify a user's other devices without previous permission from the user.

The browser application 110 may not need to parse the token 130, interpret the token 130, or interact with the token 130. The browser application 110 may store the token 130 in association with the appropriate identity and user account such as the account 123. The browser application 110 may expose the token 130 to the web application 140 when a user visits the web application 140 again. The web application 140 may recognize and interpret the token 130 because the web application 140 previously generated the token 130. The tokens 130, in some implementations, may be synced between the computer system 102 at least one other device, and the tokens can be used to generate cookies on the at least one other device.

In various implementations, a system such as the browser application 110 may request user credentials to login to a single identity on the browser application 110. If two users share a device such as the computer system 102, one user cannot access the other user's accounts without authorization. Thus, a user may log in to the browser application 110 to access their identity 122.

Each account may be associated with one or more tokens 130. The tokens 130 may be generated by a web application and provided to the browser application 110. A token may operate as an authentication credential used by a web application 140 or a platform application 150. A token may be, for example, a randomly generated string of alphanumeric characters. Examples of tokens are cookies and OAuth tokens. In one example, the browser application may allow a website save an identity as a token 130 and specify a field in the token 130, (which may be a cookie) that designates the token 130 as an account-level cookie that could be trusted more than regular cookies. The token 130 may live longer, and may be synced among a user's devices. In such an example, a website could make minimal changes to existing logic, and treat cookies with such an account-level field as long lived cookies. In other implementations, the browser application may allow a website to save a token 130 as separate from the browser application's cookie jar. In some cases, the token 130 itself is sufficient to access a web service. In other cases, the token 130 may be a refresh token, which may be used to produce or "mint" other short-lived tokens or cookies. The short-lived tokens or cookies may correspond to less valuable credentials that are used more widely by a user. In such an example, a website may have the browser application save a separate token 130. When the user returns to the website, the website may produce shorter-lived cookies if the browser application presents the token 130. In such an implementation, the website would request or check for a token 130 from the browser application before asking a user to sign in to the website. The website may issue new cookies if older cookies expire.

A developer of a web application may be comfortable sharing the token across multiple devices. The web application may store a token with the browser application 110. The web application may generate the token, for example based on an account 123 associated with the identity 122. The browser application 110 receive the token from the web application 140 or platform application 150. The browser application 110 or computer system 102 may store the token locally or remotely. The system may use the token to provide a user with automatic access to the web application or platform application without requiring a user to re-enter login credentials (e.g., user name and password) with each access attempt. Indeed, a user may no longer be required to enter or provide any user name or password for the web application, and instead, the browser may expose the token to the web application, which authenticates the token and in doing so, authenticates the user to the web application. The token may be, for example, a security feature used to prove an identity electronically, for example by a user wishing to access a bank account web application without having to enter secure credentials each time the user access the account bank web application. The token may serve as proof for a user's identity to the web application. In some implementations, the token may store a digital signature, which may be made with a private key by the web application authorized to make the signature.

Methods and systems provide convenience for users while maintaining security for user identities online. For example, a user may include certain payment information in a user-specific account cache of information that is stored on a client device, so that if the user chooses to subscribe to a monthly subscription for online television viewing using a trusted web application, the browser may expose a token, or a cookie generated using the token, to the web application, the token having been generated by the web application. The token may automatically authorize the web application (with the user's consent) to charge the user's account a monthly subscription fee, via the browser, without requiring the user to re-enter complex payment information, for example into a complicated credit card authorization form or bank routing form. For example, a user may enter account details once into a web application, which in turn may store the account details. The web application may provide a token to a browser application used by the user, and the browser application may expose the token to the web application the next time the user attempts to access the web application. The web application may then have permission to use the stored account information without requiring user re-entry of the information or of other password or credential information into the browser or into the web application.

Methods and systems described here also provide a way for multiple users to have multiple logins to a browser application, operating on one or more computer systems. Each of the users may have a single identity, but the single identity may be associated with any number of accounts of the user, each account being related to an e-mail address, third-party application, or web service, as examples.

Figure 2:
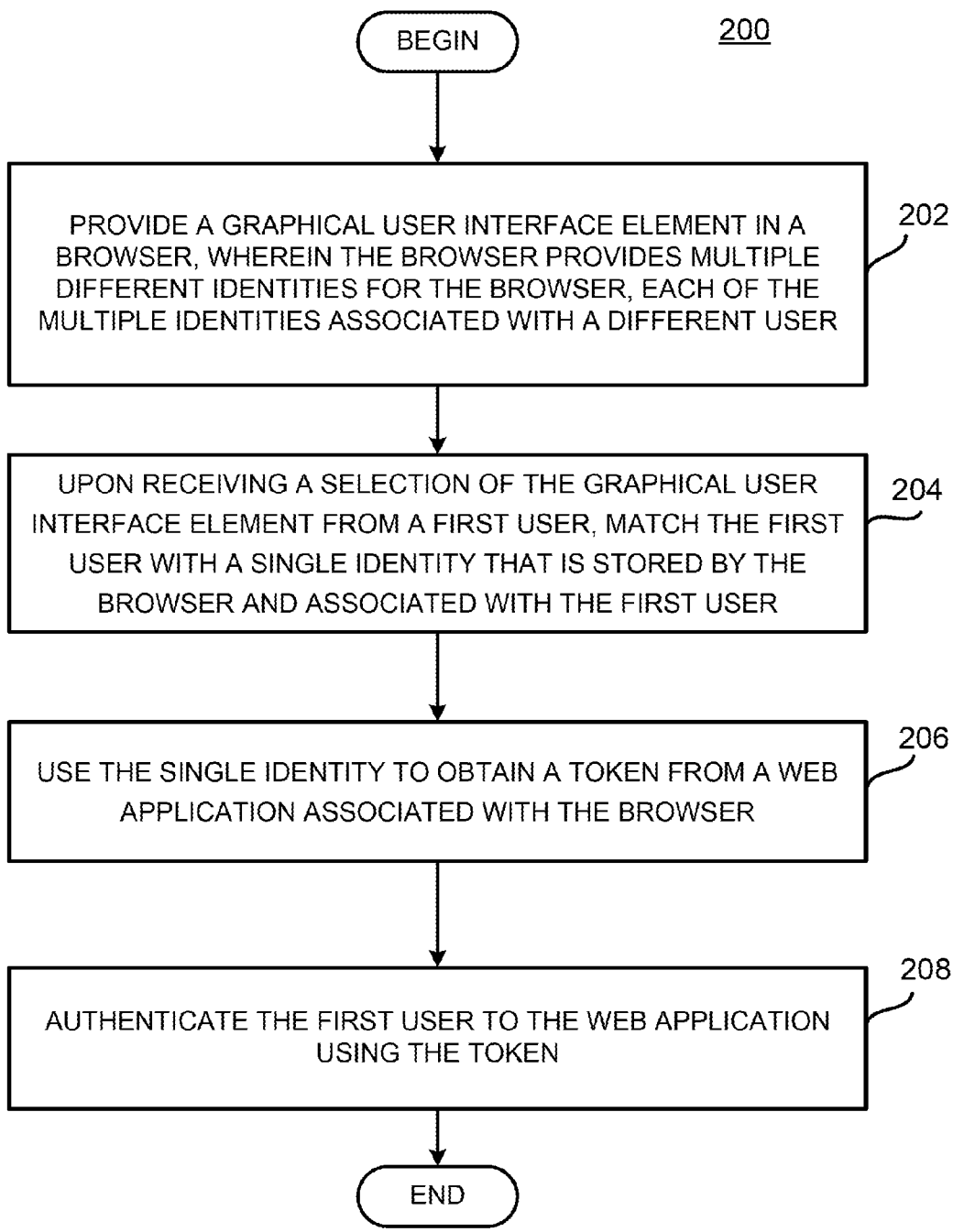
FIG. 2 is a flow diagram of an example process for utilizing a browser based identity system with multiple login, in accordance with implementations.

FIG. 2 is a flow diagram of an example process for utilizing a browser based identity system with multiple logins, in accordance with various implementations. The process 200 shown in FIG. 2 may be implemented at least in part by the computer system 102 shown in FIG. 1, and more particularly, by the processor 170 shown in the computer system 102 of FIG. 1, for example. As shown in FIG. 2, the system may provide a graphical user interface element in a browser (202). The graphical user interface element may be displayed in a chrome frame of a browser, as discussed in more detail below with respect to FIGS. 3-13. The browser may provide multiple different identities, each of the multiple different identities associated with a different user. For example, turning back to FIG. 1, three different users may respectively be associated with three different identities, e.g., identity 122, identity 126, and identity 128. Turning back to FIG. 2, upon receiving a selection of the graphical user interface element from a first user, the system may match the first user with a single identity that is stored by the browser and associated with the first user (204). For example, the user may click a GUI button or other graphical element to select a particular identity to login to that identity, after providing a user name and password or other credentials, for example, as discussed in more detail below with respect to FIGS. 3-13. The system may use the single identity to obtain a token from a web application installed on a local computing device executing the browser (206). For example, the system may, referring back to FIG. 1, use the identity 122 (for example using the account 123) to obtain at least one token 130 from the web application 140 associated with the browser application 110 installed in the computer system 102. The system may authenticate the first user to the web application 140 using the token (208). The token 130 may be, for example, a string generated by the web application 140. In some cases, the web application 130 may use the token 130 to generate a cookie. The browser application 110 does not need to interpret the token 130 (or cookie), but rather, the browser application 110 stores the token 130, and then exposes the token 130 to the web application 140 as needed, for example each time a user opens or accesses the web application 140.

Figure 3:
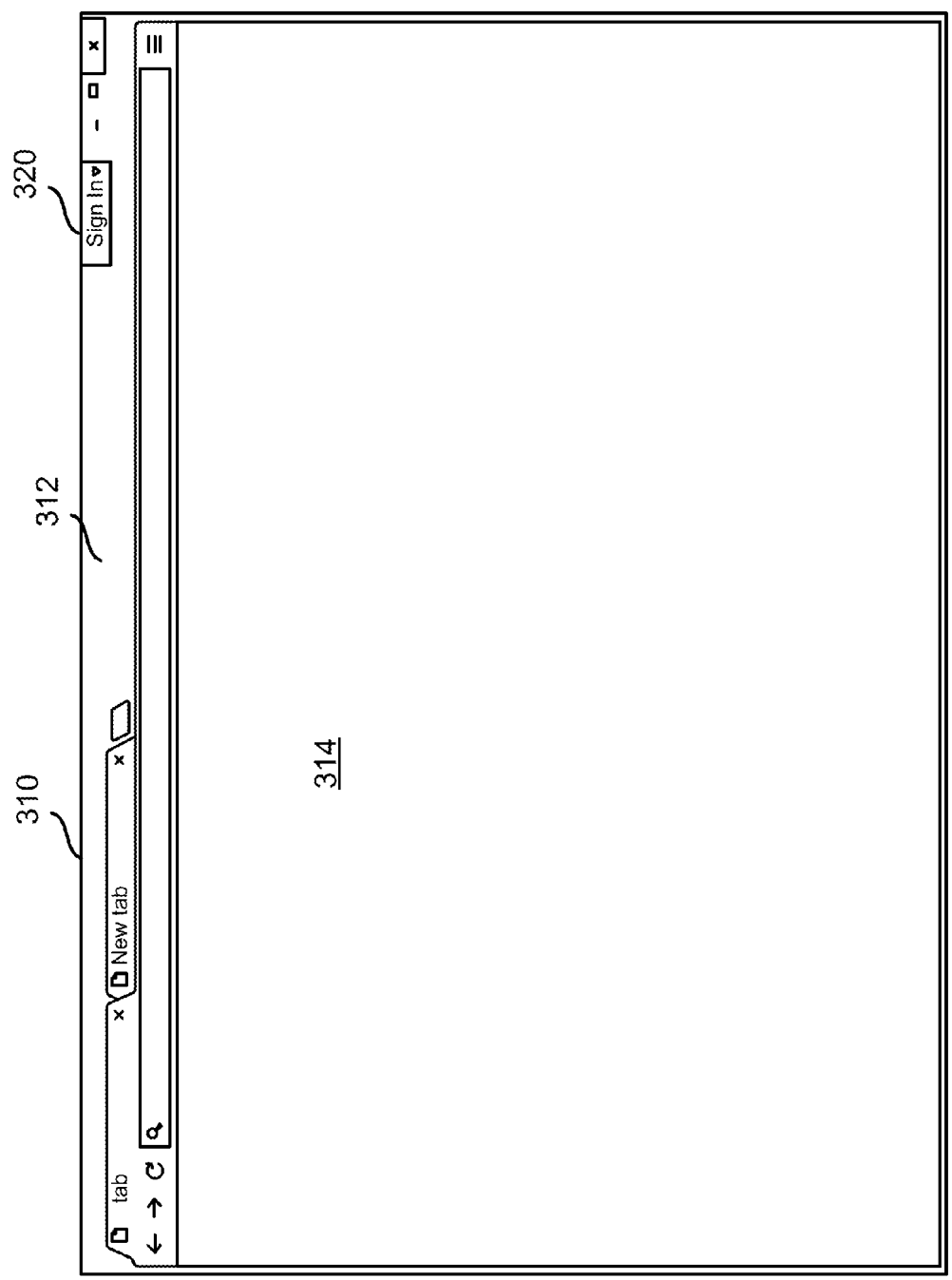
FIGS. 3-13 are example user interfaces of a web browser that may be used in accordance with implementations.

FIG. 3 is an example user interface that illustrates an example browser application with a login element. As shown in FIG. 3, the user interface 310 includes at least one area 312 that is outside of an area of a website or webpage 314. The area 312 may be referred to as a "chrome" of the browser application. The "chrome" may include borders of a web browser window, such as the user interface 310, which may include a window frame, menus, toolbars and scroll bars, as examples.

The area 312 may include a graphical user interface element 320, which in this example includes a "sign in" drop down menu option. Other implementations may include graphical user interface elements, such as element 320, in other areas of the user interface 310, such as in the webpage 314 as an example.

Figure 4:
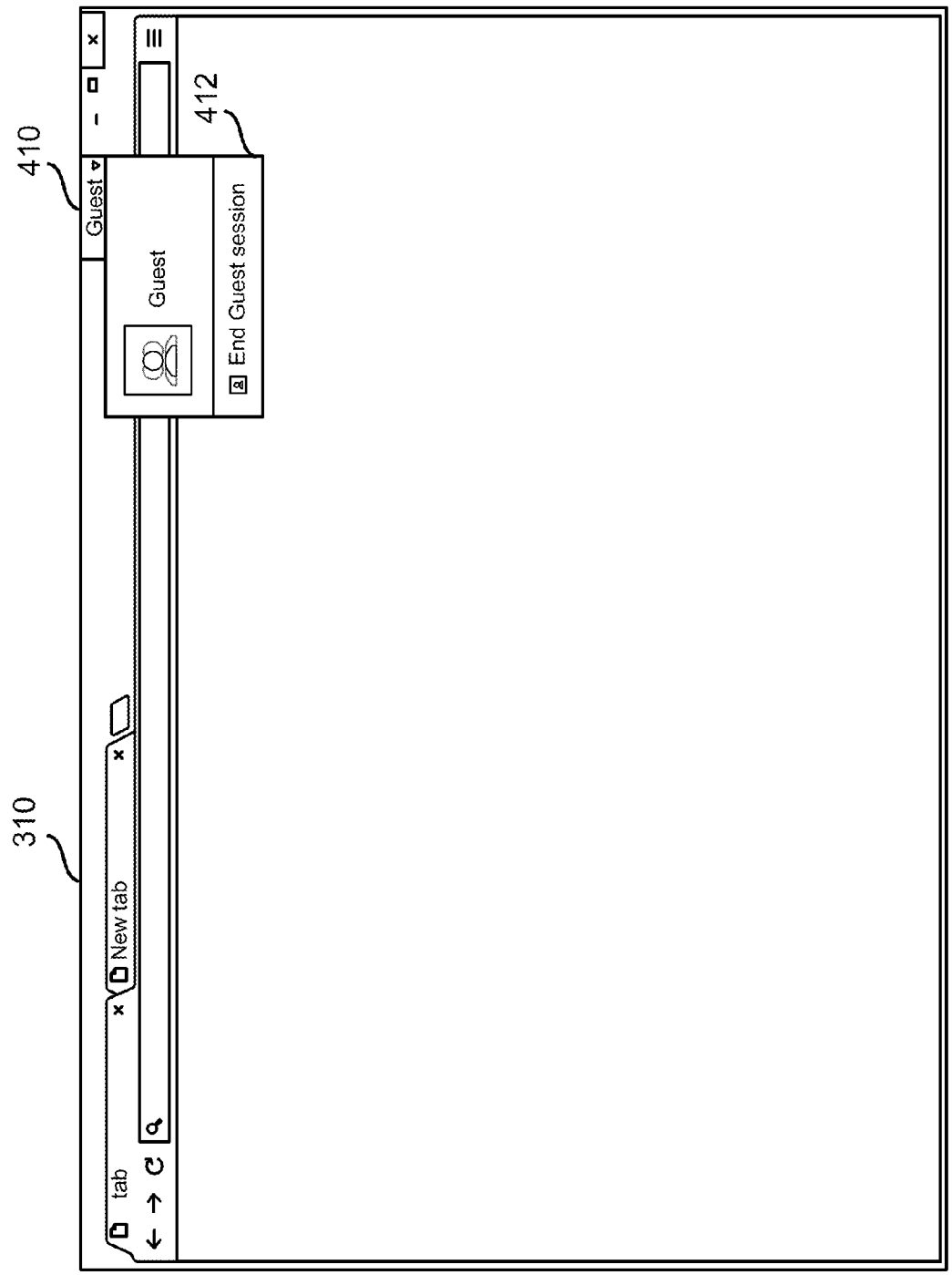

FIG. 4 is another example user interface that illustrates an example browser application with a login element. As shown in FIG. 4, the user interface 310 may include another graphical user interface element 410 "Guest" with a dropdown menu 412. The menu 412 may provide an option for a user to use the browser application as an anonymous guest, or to end a guest session, as examples.

Figure 5:
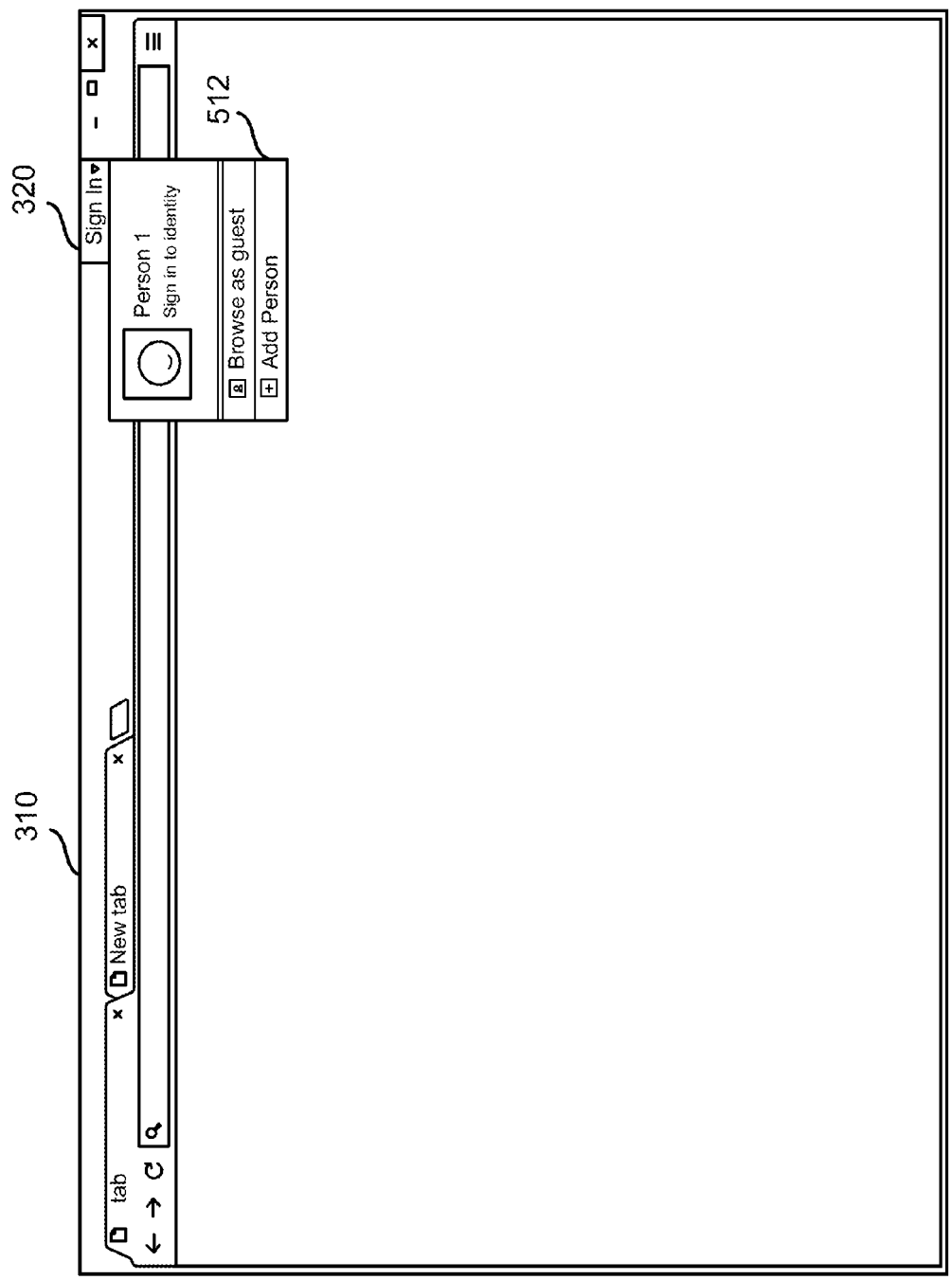

FIG. 5 is another example user interface that illustrates an example browser application with a login element. As shown in FIG. 5, the user interface 310 may include another graphical user interface drop down menu 512, which a browser application may display, for example, upon a user selection of element 320. The menu 512 may include options for "Person 1" to "Sign in to Identity" or an option to "Browse as a guest" and an option to "Add Person."

Figure 6:
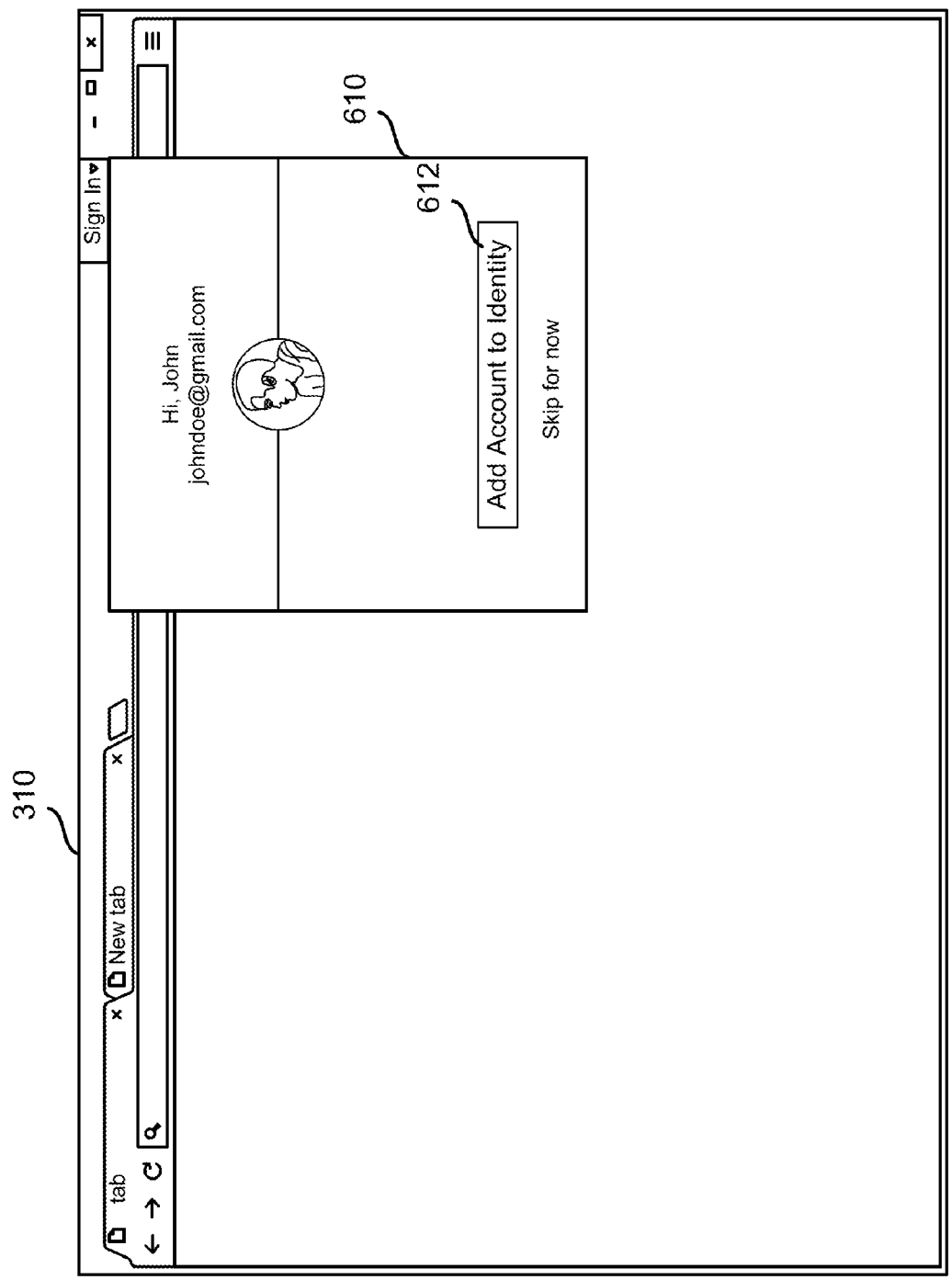

FIG. 6 is another example user interface that illustrates an example browser application with a login element. As shown in FIG. 6, the user interface 310 may include a window 610, which may be a pop-up window that appears upon a user selection of another graphical user interface element, such as an element in the menu 512 shown in FIG. 5 to "Sign in to Identity." The window 610 may provide the user with an option 612 to "Add Account to Identity" to allow the user to add an e-mail or other account to the identity associated with the user. The user may opt to "Skip for now" or "Add Account to Identity."

In various implementations, a use may open a new account on a website without having to provide a user name and password. In such a case, the website can prompt the user to open an account. The website may inform the user that the user does not have to enter a password to enter the website, so long as the user is logged into his identity (e.g., via the browser application) when he visits the website.

Figure 7:
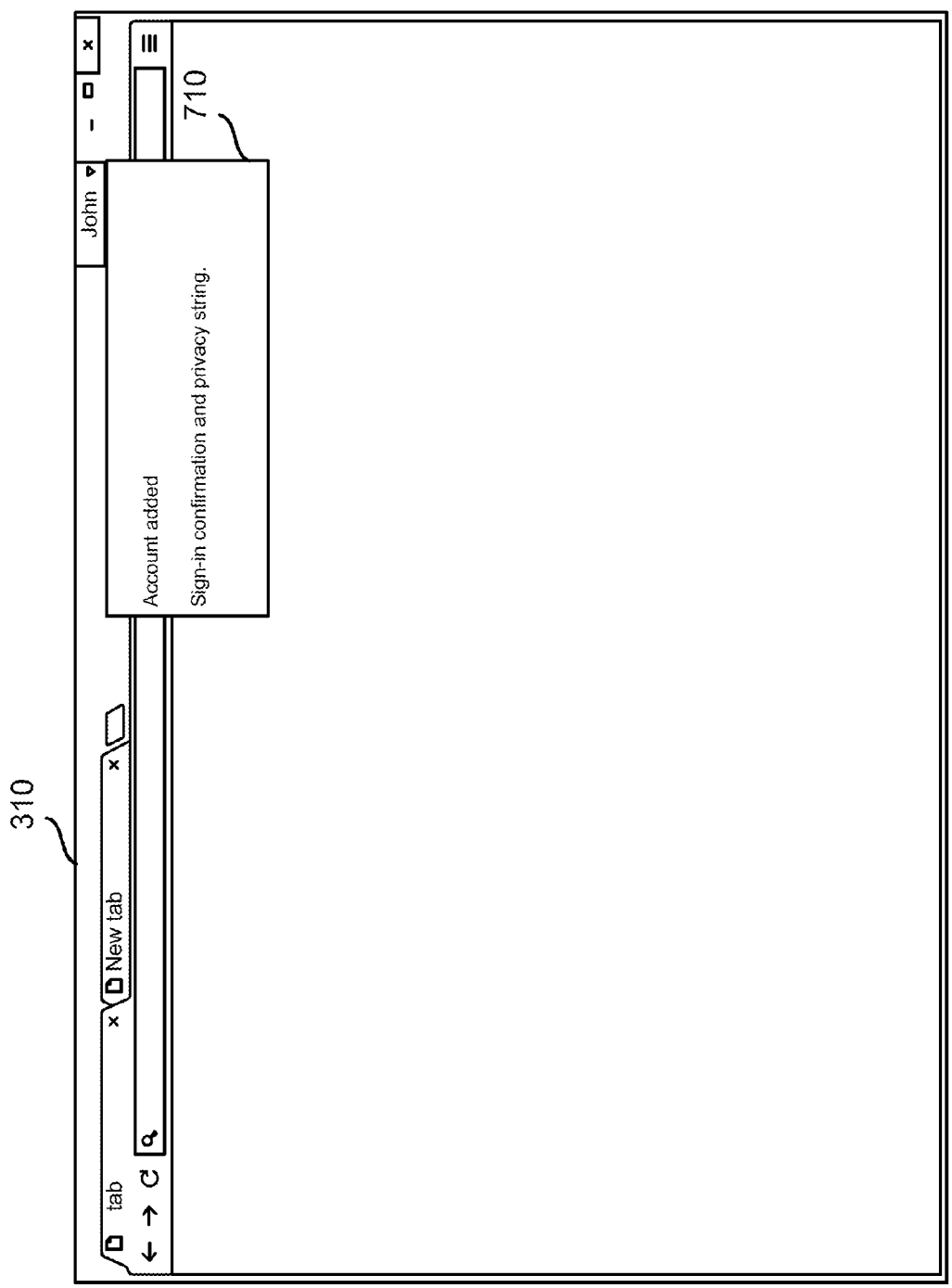

FIG. 7 is another example user interface that illustrates an example browser application with a login element. As shown in FIG. 7, the user interface 310 may include a window 710, which may be a pop-up window that appears upon a user selection of another graphical user interface element, such as the option 612 shown in FIG. 6. As shown in window 710, the account was added to the user's identity.

Figure 8:
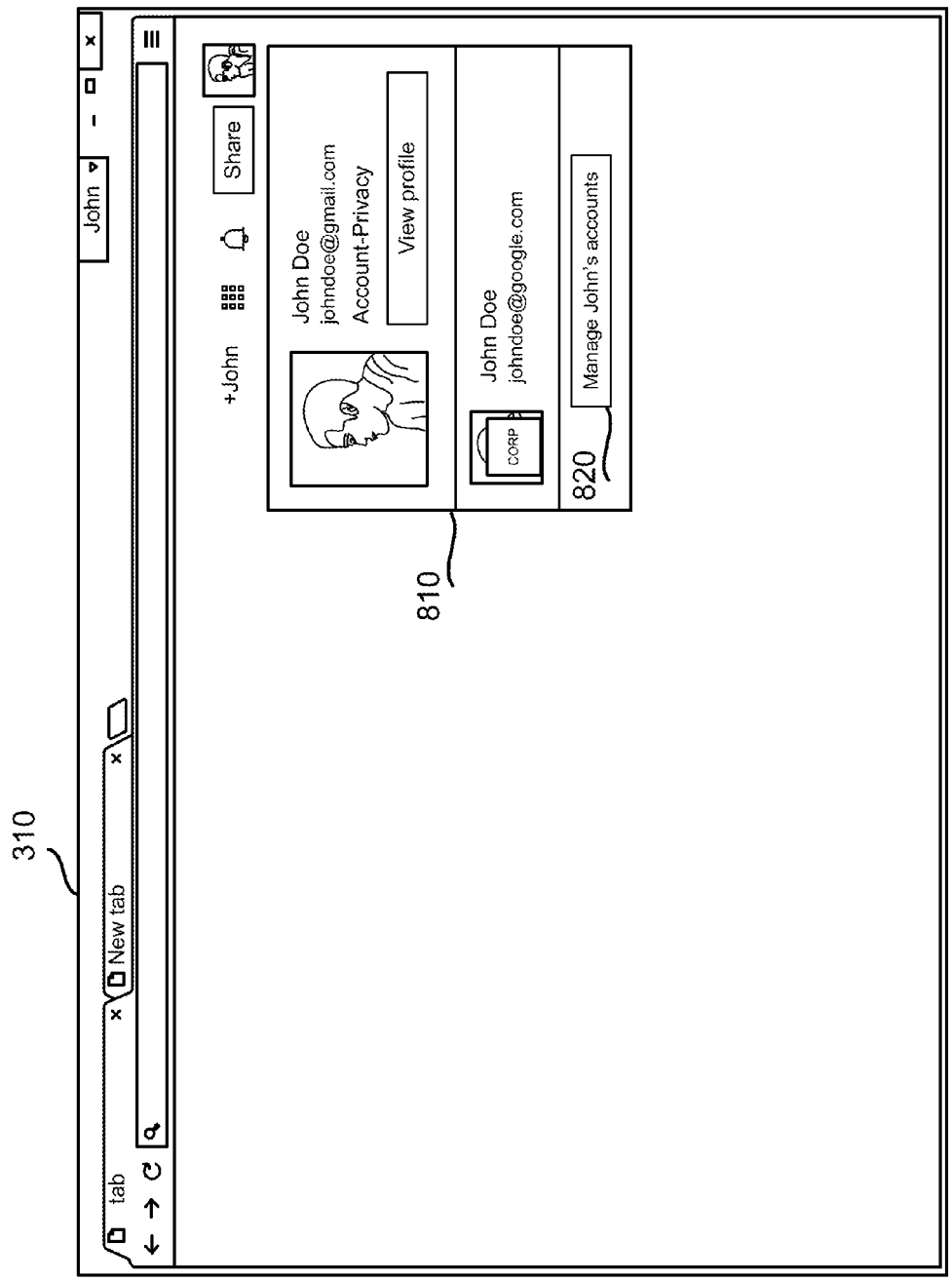

FIG. 8 is another example user interface that illustrates an example browser application with a login element. As shown in FIG. 8, the user interface 310 may include a window 810, among other graphical user interface elements. The window 810 may display various accounts associated with a signed-in user's identity. In this example, the user "John Doe" has two accounts associated with his single identity: johndoe@gmail.com, which may represent a personal email account, and johndoe@google.com, which may represent a business account. The window 810 may also include an option 820 to "Manage John's accounts." Each account may also be associated with a unique icon, photo, or avatar, as shown in window 810. If the user selects the option 820, another window may appear as shown in FIG. 9.

Figure 9:
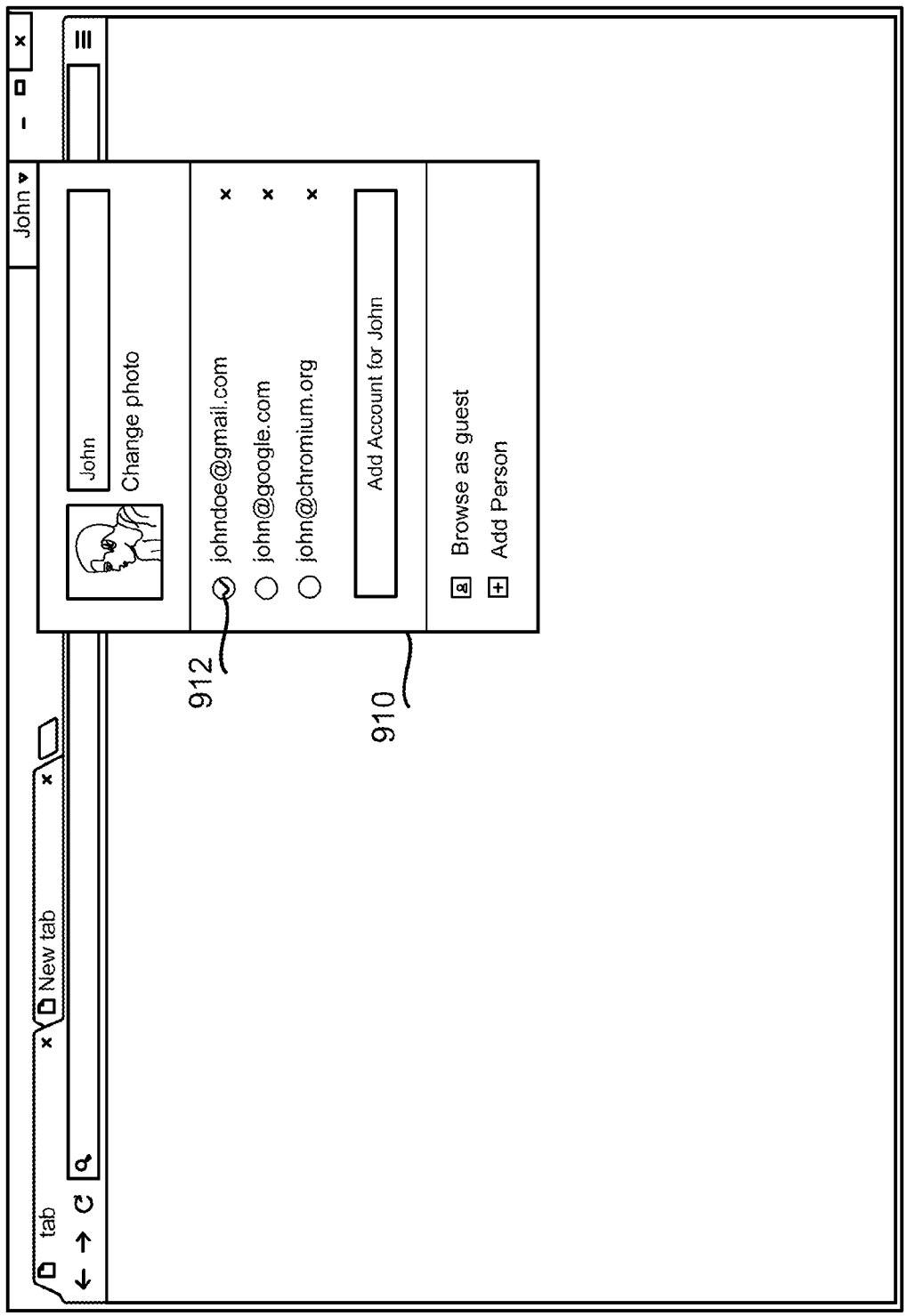

FIG. 9 is another example user interface. FIG. 9 includes a window 910 which displays various accounts associated with a user, including a selectable graphical user interface element for each account, such as element 912, as well as various options to manage the accounts.

Figure 10:
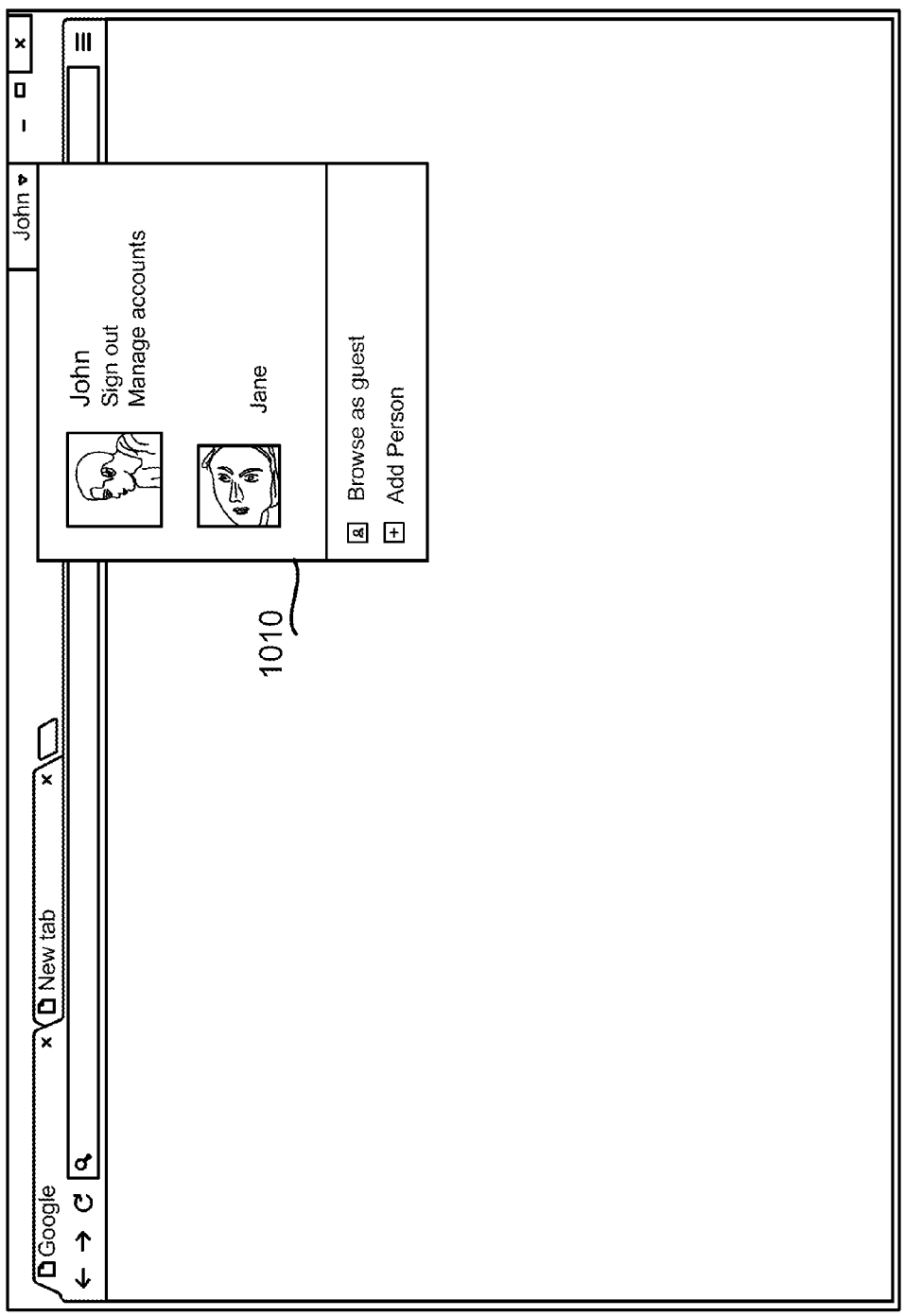

FIG. 10 is another example user interface. FIG. 10 includes a window 1010, which may include a drop down menu that includes various user identities associated with a browser application. In this example, as shown in the window 1010, a user "John" is signed into the browser application, and a user "Jane" is also available as an option for another user to sign-in to the "Jane" identity associated with the browser application with the appropriate credentials, such as login-name and password, for example. The user interface shown in FIG. 10 may allow at least one user to easily switch between accounts without having to login to the accounts or to a website each time the user visits a website. Instead of the user logging into various accounts, the user is logged into an identity, which can be associated with a plurality of individual accounts (such as email accounts). Moreover, the user may have different information provided to him by a website if logged into the website using account "A" as compared to visiting the website using account "B", all while the user is still logged into the single identity. Once the user is signed into the identity, the user can, in some cases, switch between accounts without having to re-authenticate himself. For example, Jane may manage jane@123.com, jane2@456.com, and jane@here.com. Jane can login once to an identity associated with a browser that is aware of her different accounts, and then Jane can switch between accounts by simply clicking a user interface button (e.g., switch from jane@123.com to jane2@456.com) without having to re-enter any login credentials for the accounts.

Figure 11:
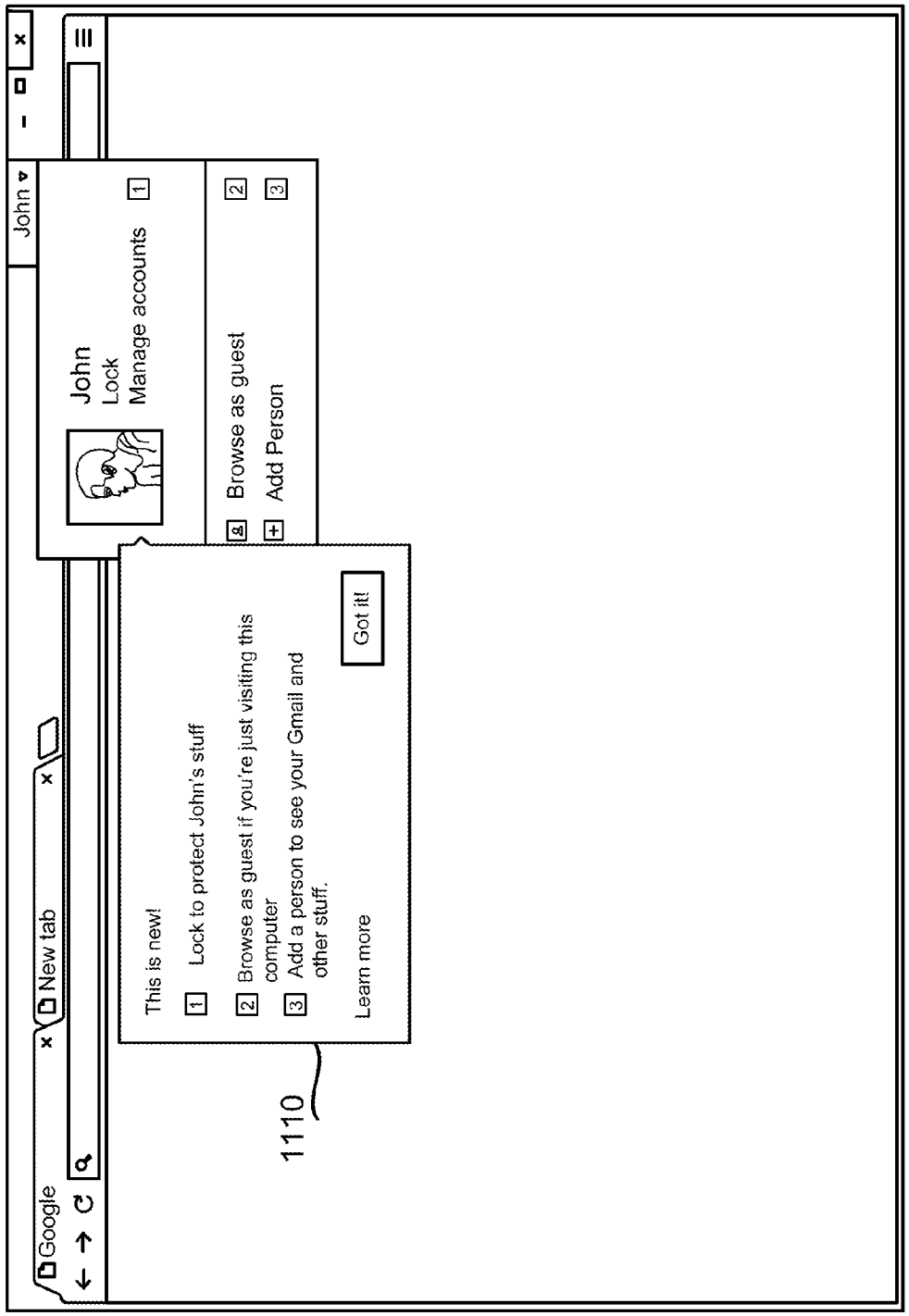

FIG. 11 is another example user interface. FIG. 11 includes a window 1110, which may include options for a user to lock the browser, browse as a guest, or add a new user, as examples. In an example where a user may lock the browser, the user may suspend a browser session to effectively place a privacy barrier on the browser before stepping away from the browser, for example, before resuming a session. The window 1110 may be a pop-up script or HTML window that includes various information about options for a user to manage an account or identity associated with a browser application. In various other implementations, the user may also sign out of the browser.

Figure 12:
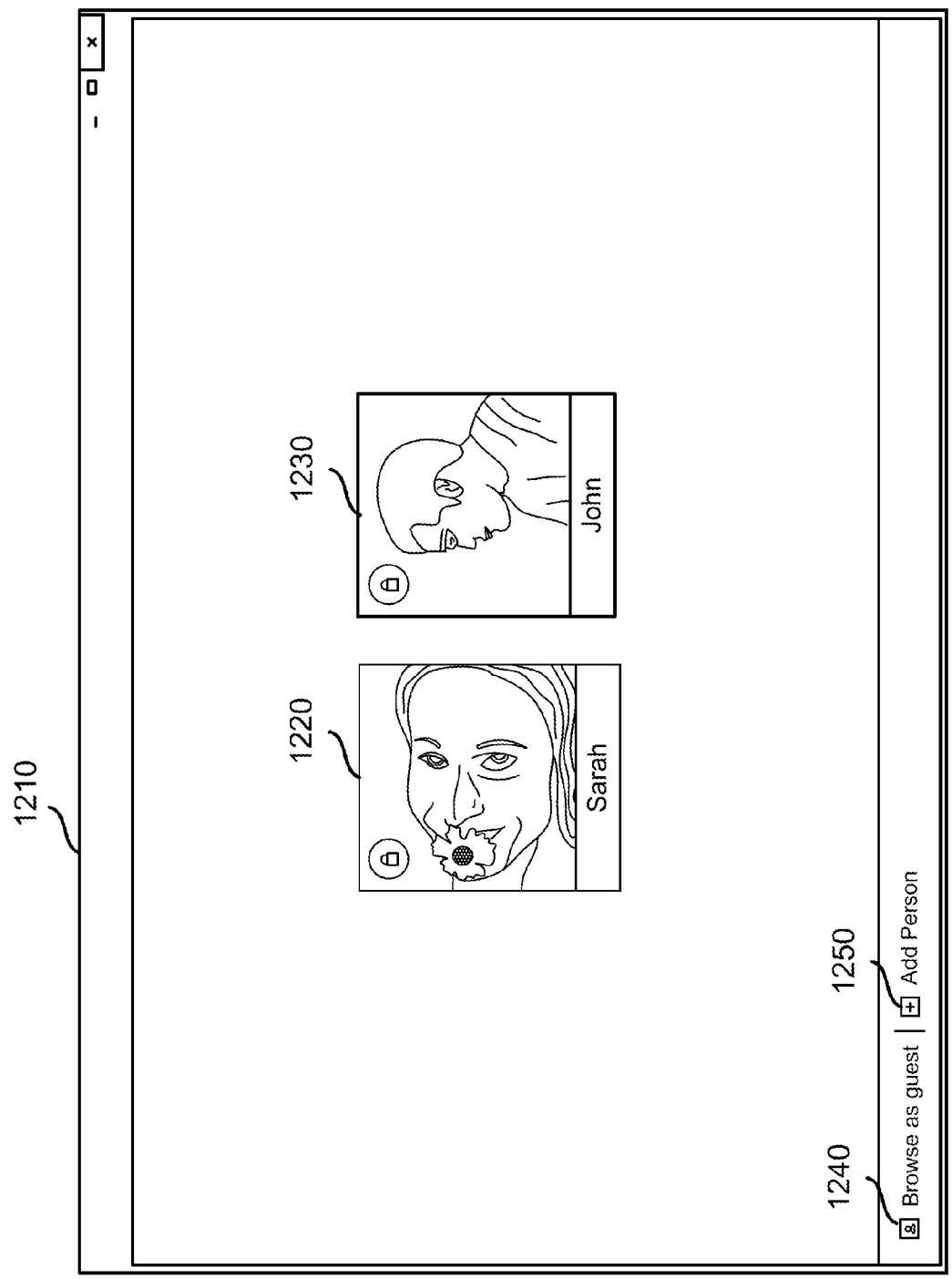
Figure 13:
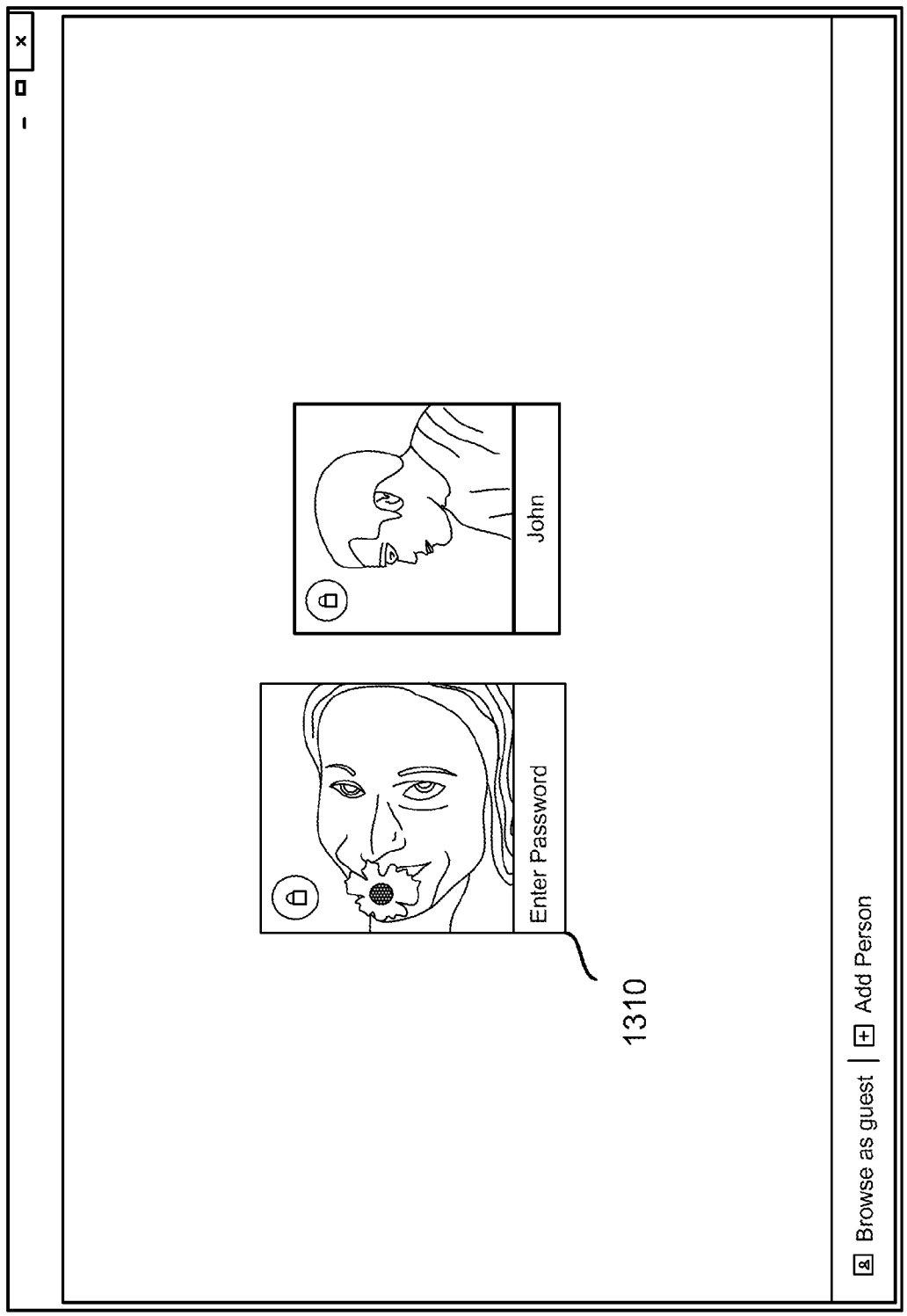

FIG. 12 is another example user interface 1210, which may represent a web browser window. The window may include graphical user interface elements 1220 and 1230. The element 1220 may be associated with a first identity "Sarah", and the element 1230 may be associated with a second identity "John", each identity corresponding to a single user. The elements 1220 and 1230 may be selectable icons, avatars, photos, text, or combinations of the same, and upon selection of an element 1220 or 1230, a user may be asked to provide login credentials such as a user name and password, to access the identity, as well as accounts associated with the identity. The user interface 1210 may also include graphical user interface element options, including option 1240 to "Browse as guest" and option 1250 to "Add Person." Alternatively or additionally, upon selection of the element 1220, the user may be prompted to enter only a password, as shown in FIG. 13 by element 1310.

In certain implementations, the browser application can provide an identity service so that user-specific account information such as email address, login, bank routing information, game credentials, or other information can be stored in conjunction with an identity of the user and associated with the browser and then automatically provided to web applications that have permission to access the user-specific information. In this manner, a user may grant permission to a web application once to access such user-specific account information and then may not need to manually provide, or authorize the provision of, such account information such as bank routing information, when the user is using the web application in the future from the same browser application. Moreover, multiple users that access the same browser may login to their identities to utilize their account information via the same browser. Thus, a user can store user-specific identities, including account information, and then may allow the information to be used by certain web applications that have been granted permission to access the information but not allow the information to be used by other websites or web applications that do not have explicit permission to access the user-specific account information. In this manner, a web application can be utilized to the user's advantage, because the user may not want to share his user-specific account information with any random website that he visits, but may find it advantageous to be able to easily provide such information to web applications that are installed on one or more local client computing devices that execute a browser that stores the user's identity.

In some implementations, the user may access the various services by logging into multiple different accounts associated with the different services. For example, the user may log in to an account associated with the user's online e-mail account, the user's online social network account, the user's online photo account, or accounts at content websites (e.g., news websites game websites, entertainment websites, etc.), etc. A sync server may ensure that local data from a computing device (e.g., the computer system 102 shown in FIG. 1) is synced across all of a user's devices or all devices that are used to log the user into the single identity. For example, the sync server may sync at least one token such as the token 130 in FIG. 1 with another user device. Further, a sync server may sync across different devices all installed web applications, browser extensions, browser bookmarks, settings, profiles, browser history, themes, plugins, local permissions, user-specific account information, tokens, and data associated with the web applications and browser extensions for a user. For example, if a user of the computer system 102 accesses the identity 122 (for example, via a browser application 110) from computer system 102, the sync server may copy settings and data associated with web applications (for example, that the user has selected to sync) from the user account to another device, such as a phone. Changes to settings on one computing device may be automatically copied (e.g., via sync server) from other computers (for example, if the user has enabled that sync feature). Synced data may be encrypted when it travels between computing devices, and sync server to keep information secure.

In various implementations the identities 122, 126, and 128 including the accounts 123, 124, and 125, and associated data such as login credentials or tokens associated with the accounts, can be permanently stored in a secure manner within a nonvolatile memory (e.g., memory 190) and then loaded when the user successfully logs into the browser application 110.

In another implementation, user-specific identity information can be permanently stored in a memory device of an online server. Then, when the user logs into an account associated with a service provided by the online server, the user-specific identity can be downloaded from the online server to a cache of the computer system 102, for use by the browser application 110, with permission from a user. The identity can be downloaded using secure encryption techniques to protect the information while it is being downloaded.

The browser application 110 can be associated with identity information for different users. For example, different users may provide login information through a user interface provided by the browser, as discussed in more detail below with respect to FIGS. 3-13, so that the browser to can retrieve and cache the different user-specific identities for the different users. Alternatively or additionally, various users of the same client device (e.g., a husband and wife using the same desktop computer) may create and maintain separate identity profiles having separate identity information, yet may allow each other permission to use their identities.

Web applications can use user-specific identity information in a variety of ways. For example, a web application may provide user-specific content to the user through the web application, where the user-specific content is based on the user's-specific identity information that is provided by the browser to the web application. The user-specific content can be content that is specially selected based on the user's interests, demographics, location, or other such user-specific identity information.

A browser can be shared by multiple users, and each user may have different accounts associated with a single identity. Thus, when different users login to the browser and launch the an e-mail web application within the browser, the application may provide different user-specific content to each of the different users based on the account information pulled by the web application from the browser for each of the different users, without the user having to take any additional steps (e.g., login, enter passwords, etc.) after logging into the browser, other than launching the web application.

Figure 14:
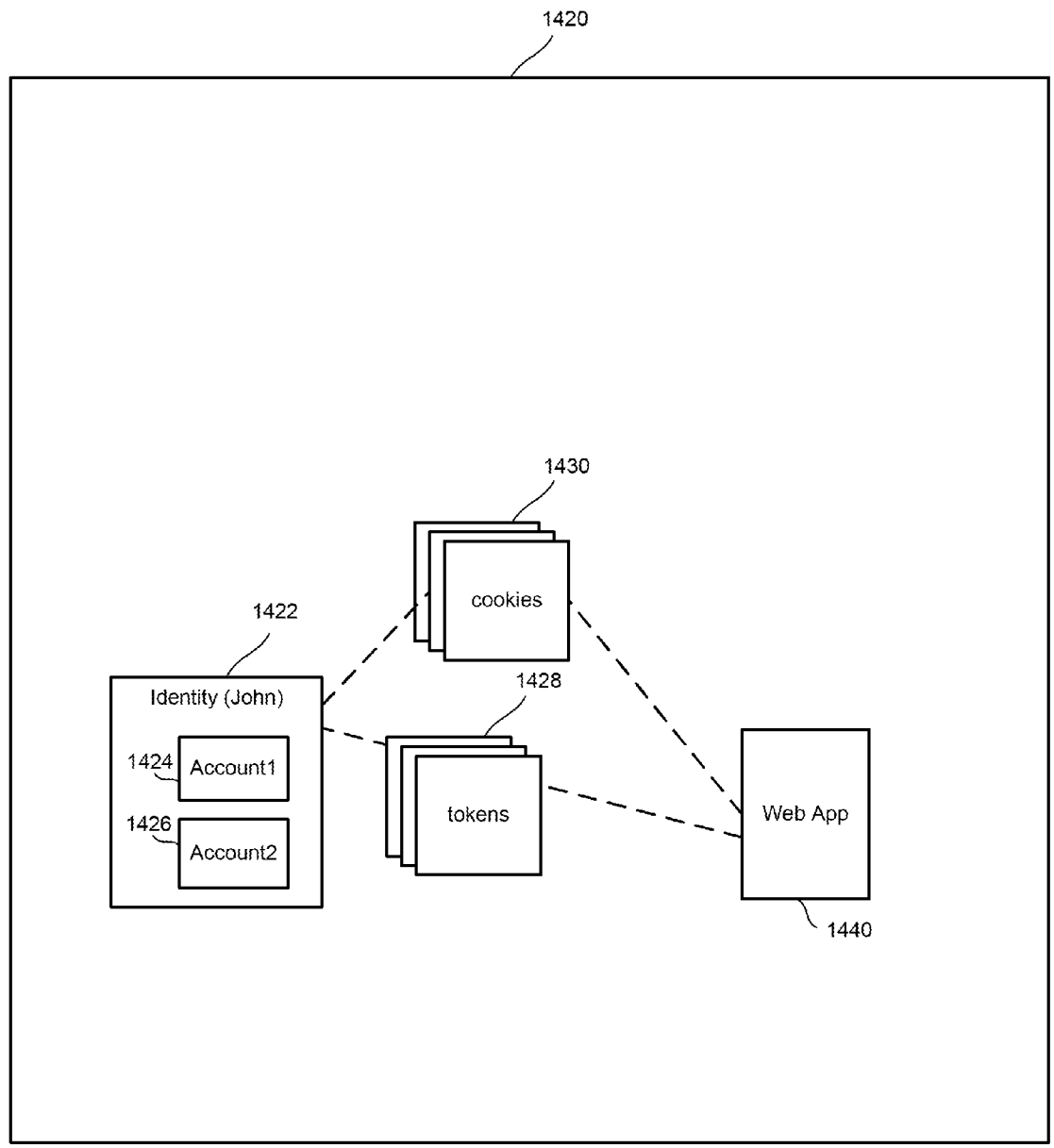
FIG. 14 is a block diagram of a system that may execute an application that communicates with a web application.

FIG. 14 is a block diagram of an example of an exchange of tokens between an application and a web application. FIG. 14 includes an application 1420, which includes at least one identity 1422. The application 1420, which may be a web browser, communicates with at least one web application 1440. An identity 1422 "John" may include at least two accounts 1424 and 1426. Multiple user identities may be associated with the application 1420, but generally only one user may login to the application 1420 at a time.

The identity 1422 is not provided to the web application 1440 or to other websites, thus providing security for user identities online. A message encrypted with the user's account information, such as information about account 1424, however, may be provided to web applications 1440 or to other websites, with the user's consent, thus eliminating the need for the user to re-enter personal identity information (such as name, login, or even financial information) each time the user wishes to access a different web application using the application 1420. For example, system may provide a cookie 1430 to the web application.

The web application 1440 may receive a token 1428 from the web application 1440 in response to providing account information, for example the first time the web application 1440 receives the account information. The token 1428 may be a secure, unique key or an alphanumeric string. The web application 1440 may use the token 1428 to automatically authenticate the user to the web application 1440, eliminating the need for the user to continually re-authenticate himself to different web applications each time the user wishes to access a web application using the application 1420. In some cases, the system may generate a cookie 1430 using the token 1428. In various implementations, each web application may provide a separate token 1428 to the application 1420 at least once. The tokens 1428 may be stored natively, for example in a memory of a computing device executing the application 1420, or may in some implementations be stored remotely, for example at a server. In some implementations, the tokens 1428 may be machine-independent and may be synced among multiple computing devices associated with the identity 1422. For example, when a user logs into a separate computer system, and visits a website, the system may expose a token to the website via the second device based on the user's identity, and in some cases, the user may be automatically logged into the website.

In various implementations, if a cookie 1430 expires, the application 1420 may generate a new cookie 1430 using the token 1428. In some cases, the application 1420 may return to the web application 1440 and expose the corresponding token 1428 to the web application 1440, to retrieve a new token to 1428 from the web application 1440. The application 1420 may generate a new cookie using the new token.

The application 1420 may thus utilize a user's identity to expose the identity to at least one web service, such as a web application, which may be a platform application, obtain a token, and use the token to authenticate the user to the web application. Account management may therefore happen at an application level, such as at a browser level.

Figure 15:
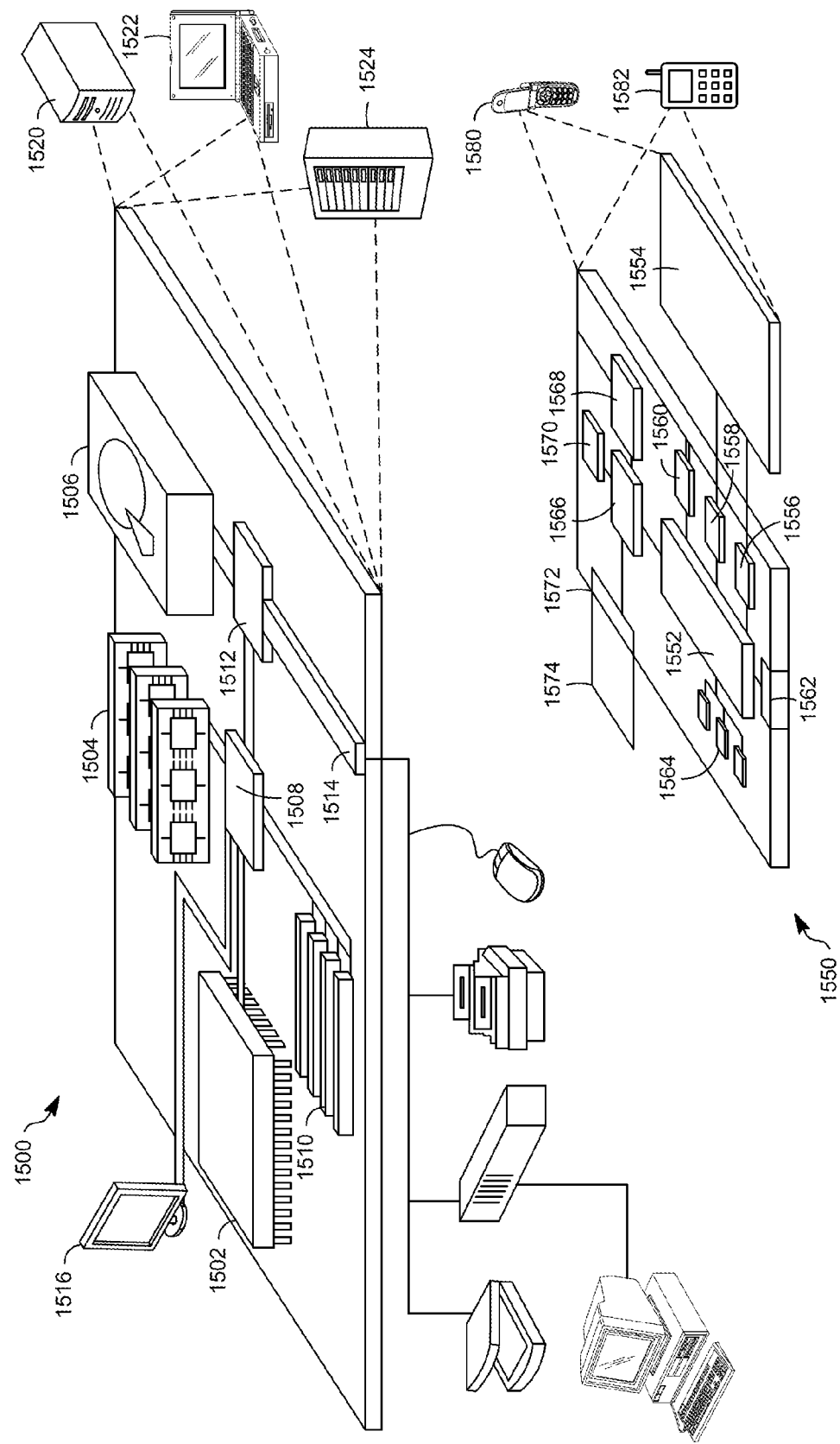
FIG. 15 is an example block diagram of a computer device and a mobile computer device that can be used to implement the techniques described in FIGS. 1-14.

FIG. 15 shows an example of a generic computer device 1500 and a generic mobile computer device 1550, which may be used with the techniques described here. Computing device 1500 is intended to represent various forms of digital computers, such as laptops, desktops, workstations, personal digital assistants, servers, blade servers, mainframes, and other appropriate computers. Computing device 1550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1500 includes a processor 1502, memory 1504, a storage device 1506, a high-speed interface 1508 connecting to memory 1504 and high-speed expansion ports 1510, and a low speed interface 1512 connecting to low speed bus 1514 and storage device 1506. Each of the components 1502, 1504, 1506, 1508, 1510, and 1512, are interconnected using various busses, and may be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as display 1516 coupled to high speed interface 1508. In other implementations, multiple processors and/or multiple buses may be used, as appropriate, along with multiple memories and types of memory. Also, multiple computing devices 1500 may be connected, with each device providing portions of the necessary operations (e.g., as a server bank, a group of blade servers, or a multi-processor system).

The memory 1504 stores information within the computing device 1500. In one implementation, the memory 1504 is a volatile memory unit or units. In another implementation, the memory 1504 is a non-volatile memory unit or units. The memory 1504 may also be another form of computer-readable medium, such as a magnetic or optical disk.

The storage device 1506 is capable of providing mass storage for the computing device 1500. In one implementation, the storage device 1506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1504, the storage device 1506, or memory on processor 1502.

The high speed controller 1508 manages bandwidth-intensive operations for the computing device 1500, while the low speed controller 1512 manages lower bandwidth-intensive operations. Such allocation of functions is exemplary only. In one implementation, the high-speed controller 1508 is coupled to memory 1504, display 1516 (e.g., through a graphics processor or accelerator), and to high-speed expansion ports 1510, which may accept various expansion cards (not shown). In the implementation, low-speed controller 1512 is coupled to storage device 1506 and low-speed expansion port 1514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1500 may be implemented in a number of different forms, as shown in the figure. For example, it may be implemented as a standard server 1520, or multiple times in a group of such servers. It may also be implemented as part of a rack server system 1524. In addition, it may be implemented in a personal computer such as a laptop computer 1522. Alternatively, components from computing device 1500 may be combined with other components in a mobile device (not shown), such as device 1550. Each of such devices may contain one or more of computing device 1500, 1550, and an entire system may be made up of multiple computing devices 1500, 1550 communicating with each other.

Computing device 1550 includes a processor 1552, memory 1564, an input/output device such as a display 1554, a communication interface 1566, and a transceiver 1568, among other components. The device 1550 may also be provided with a storage device, such as a microdrive or other device, to provide additional storage. Each of the components 1550, 1552, 1564, 1554, 1566, and 1568, are interconnected using various buses, and several of the components may be mounted on a common motherboard or in other manners as appropriate.

The processor 1552 can execute instructions within the computing device 1550, including instructions stored in the memory 1564. The processor may be implemented as a chipset of chips that include separate and multiple analog and digital processors. The processor may provide, for example, for coordination of the other components of the device 1550, such as control of user interfaces, applications run by device 1550, and wireless communication by device 1550.

Processor 1552 may communicate with a user through control interface 1558 and display interface 1556 coupled to a display 1554. The display 1554 may be, for example, a TFT LCD (Thin-Film-Transistor Liquid Crystal Display) or an OLED (Organic Light Emitting Diode) display, or other appropriate display technology. The display interface 1556 may comprise appropriate circuitry for driving the display 1554 to present graphical and other information to a user. The control interface 1558 may receive commands from a user and convert them for submission to the processor 1552. In addition, an external interface 1562 may be provided in communication with processor 1552, so as to enable near area communication of device 1550 with other devices. External interface 1562 may provide, for example, for wired communication in some implementations, or for wireless communication in other implementations, and multiple interfaces may also be used.

The memory 1564 stores information within the computing device 1550. The memory 1564 can be implemented as one or more of a computer-readable medium or media, a volatile memory unit or units, or a non-volatile memory unit or units. Expansion memory 1574 may also be provided and connected to device 1550 through expansion interface 1572, which may include, for example, a SIMM (Single In Line Memory Module) card interface. Such expansion memory 1574 may provide extra storage space for device 1550, or may also store applications or other information for device 1550. Specifically, expansion memory 1574 may include instructions to carry out or supplement the processes described above, and may include secure information also. Thus, for example, expansion memory 1574 may be provided as a security module for device 1550, and may be programmed with instructions that permit secure use of device 1550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1564, expansion memory 1574, or memory on processor 1552, that may be received, for example, over transceiver 1568 or external interface 1562.

Device 1550 may communicate wirelessly through communication interface 1566, which may include digital signal processing circuitry where necessary. Communication interface 1566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1568. In addition, short-range communication may occur, such as using a Bluetooth, WiFi, or other such transceiver (not shown). In addition, GPS (Global Positioning System) receiver module 1570 may provide additional navigation- and location-related wireless data to device 1550, which may be used as appropriate by applications running on device 1550.

Device 1550 may also communicate audibly using audio codec 1560, which may receive spoken information from a user and convert it to usable digital information. Audio codec 1560 may likewise generate audible sound for a user, such as through a speaker, e.g., in a handset of device 1550. Such sound may include sound from voice telephone calls, may include recorded sound (e.g., voice messages, music files, etc.) and may also include sound generated by applications operating on device 1550.

The computing device 1550 may be implemented in a number of different forms, as shown in the figure. For example, it may be implemented as a cellular telephone D80. It may also be implemented as part of a smart phone D82, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
providing a plurality of graphical user interface elements in a browser, each graphical user interface element of the plurality of user interface elements corresponding with a respective user identity of a plurality of user identities for the browser, each user identity of the plurality of user identities being associated with a different user, each of the plurality of user identities being associated with one or more user accounts;
upon receiving a selection of a first graphical user interface element of the plurality of graphical user interface elements, matching the first graphical user interface element with a first user identity of the plurality of user identities and that is associated with a first user;
upon receiving a second selection of a second graphical user interface element of the plurality of graphical user interface elements, matching the second graphical user interface element with a second user identity of the plurality of user identities and that is associated with a second user;
automatically syncing data associated with the first identity among multiple computing devices associated with the first identity;
using the first identity to obtain a token from a web application associated with the browser; and
authenticating the first user to the web application using the token.

2. The method of claim 1, wherein the web application is precompiled and executed directly by a processor of a computing device using a browser-based runtime environment.

3. The method of claim 1, wherein the web application is coded using a browser-based language.

4. The method of claim 1, wherein at least some of the accounts are associated with third party website services.

5. A method comprising:
providing a plurality of graphical user interface elements in a chrome frame of a browser, each graphical user interface element of the plurality of user interface elements corresponding with a respective user identity of a plurality of user identities for the browser, each user identity of the plurality of user identities being associated with a different user;
upon receiving a selection of a first graphical user interface element of the plurality of graphical user interface elements, matching the first graphical user interface element with a first user identity of the plurality of user identities and that is associated with a first user;
using the first user identity to obtain a token from a web application associated with the browser;
authenticating the first user to the web application using the token, and
automatically syncing the first user identity among multiple computing devices associated with the first user.

6. The method of claim 5, further comprising:
storing the token in association with the first user identity.

7. The method of claim 5, wherein the web application is precompiled and executed directly by a processor of a computing device using a browser-based runtime environment.

8. The method of claim 5, wherein the web application is coded using a browser-based language.

9. The method of claim 5, wherein the plurality of graphical user interface elements provides an option to associate an account with the first user identity.

10. The method of claim 5, wherein the first user identity is associated with multiple accounts corresponding with the first user, at least some of the multiple accounts being associated with third party web services.

11. The method of claim 5, wherein the plurality of graphical user interface element provides an option for a second user to access a second user identity of the plurality of user identities.

12. The method of claim 11, wherein the second identity is associated with multiple accounts corresponding with the second user.

13. A non-transitory computer readable medium containing instructions executable by a processor of a computing device, that when executed by the processor cause the computing device to:
provide a plurality of graphical user interface elements in a chrome frame of a browser, each graphical user interface element of the plurality of user interface elements corresponding with a respective user identity of a plurality of user identities for the browser, each user identity of the plurality of user identities being associated with a different user;
upon receiving a selection of a first graphical user interface element of the plurality of graphical user interface elements, match the first graphical user interface element with a first user identity of the plurality of user identities, the first user identity being stored by the browser and associated with a first user;
use the first user identity to obtain a token from a web application associated with the browser;
authenticate the first user to the web application using the token; and
automatically sync the first user identity among multiple computing devices associated with the first user.

14. The non-transitory computer readable medium of claim 13, wherein the web application is precompiled and executed directly by the processor of the computing device using a browser-based runtime environment.

15. The non-transitory computer readable medium of claim 13, wherein the web application is coded using a browser-based language.

16. The non-transitory computer readable medium of claim 13, wherein the plurality of graphical user interface elements provides an option to modify the first user identity.

17. The non-transitory computer readable medium of claim 13, wherein the first user identity is associated with multiple accounts corresponding with the first user, at least some of the multiple accounts being associated with third party web services.

18. The non-transitory computer readable medium of claim 13, wherein the plurality of graphical user interface elements provides an option for a second user to access a second user identity of the plurality of user identities.

19. The non-transitory computer readable medium of claim 18, wherein the second user identity is associated with multiple accounts corresponding with the second user.

20. non-transitory computer readable medium of claim 13, wherein the token is an alphanumeric string generated by the web application.

21. A system including:
a memory; and
a processor operably coupled to the memory and configured to execute code to cause the system to:
provide a plurality of graphical user interface elements in a chrome frame of a browser, each graphical user interface element of the plurality of user interface elements corresponding with a respective user identity of a plurality of user identities for the browser, each of the plurality of user identities being associated with a different user;
upon receiving a selection of a first graphical user interface element of the plurality of graphical user interface elements, match the first graphical user interface element with a user identity of the plurality of user identities, the user identity being stored by the browser and associated with a respective user;
use the user identity to obtain a token from a web application associated with the browser;
authenticate the respective user to the web application using the token; and
automatically sync the user identity among multiple computing devices associated with the respective user.

22. The system of claim 21, wherein the token is an alphanumeric string generated by the web application.

23. The system of claim 21, the processor being further configured to cause the system to store the token in association with the user identity.

* * * * *